Patented Oct. 20, 1953

2,656,277

UNITED STATES PATENT OFFICE 2,656,277

UNDERFILLING MATERIAL FOR TOOTH-FILLINGS

Adolf Knappwost, Neuhausen, near Urach, Germany, assignor, by mesne assignments, to Vivadent Corporation, Boston, Mass., a corporation of Massachusetts No Drawing. Application December 14, 1950, Serial No. 200,868. In Germany December 20, 1949

1 Claim. (Cl. 106—35)

To isolate the tooth-pulp from impulses of temperature under metal fillings and to intercept chemical agents e. g. acids under silicate cement fillings invariably zinc phosphate cements are being used as underfilling material. They are, however, unsuitable in immediate proximity of the pulp, and particularly so with pulp having incisions. Heretofore a calcium hydroxide paste consisting of calcium hydroxide $Ca(OH)_2$ and water or Ringer solution (blood salt solution) has frequently been used in such cases. This paste has several great disadvantages. In the first line the content of sodium bicarbonate $NaHCO_3$ in the Ringer solution causes an immediate precipitation of calcium carbonate $CaCO_3$ and the liberation of an equivalent amount of caustic soda $NaOH$. The main disadvantage, however, consists in its deficient consistency and adhesiveness which permits its application in but relatively few cases with favorably situated cavities. There is, however, an urgent demand for an underfilling material of wide applicability built up on a calcium hydroxide basis because tooth-pulp stands calcium hydroxide best.

Now thorough researches and tests have proved that the disadvantages of the former usual calcium hydroxide paste are avoided by adding casein to calcium hydroxide. But when doing so, the casein percentage should not lie far above that of the calcium hydroxide as it does with the well-known technical casein glue, but should amount to no more than 50 per cent by weight maximum referred to the calcium hydroxide content of the paste. The fundamental substance shall thus remain the calcium hydroxide. Such a paste possesses not only an excellent elasticity and adhesiveness, similar to the mineral hard substance of the tooth, it is also built up from organic and inorganic material, the phosphate component emanating from the casein being of importance. As proved by thorough researches the material also sets in such a way that it does not disintegrate after accession of saliva. Hardened material shows a firmness far superior to that of ordinary calcium hydroxide and a smooth surface similar to galalith. Subsequent clinical tests have shown that even pulps having incisions remain fully alive under this underfilling material and very quickly form a bony closure of the pulp chamber.

For the application of this underfilling material it is furthermore of importance that calcium hydroxide $Ca(OH)_2$ in dry condition and prepared with five to ten per cent by weight of calcium oxide $CaO$ referred to the dry calcium hydroxide, so as to ensure the resistance to storing, may be mixed without difficulty with the dry casein. In practice when stirring with water a noticeable increase of temperature of the mix will then occur owing to the reaction of the calcium hydroxide with the tap water which tends to shorten the stirring process considerably. In practice this underfilling material may be mixed to any desired consistency within two to three minutes. It does not deliquesce like the common potassium hydroxide pastes, if during the insertion of the paste into the cavity some saliva is admitted. It is so universally applicable that as an underfilling material it can even substitute the phosphate cements which cannot be used at all in proximity to pulp. This has been shown by thorough tests in practice and in the clinics.

According to the invention an underfilling material under tooth-fillings is therefore applied consisting of calcium hydroxide $Ca(OH)_2$ with addition of dry casein which may amount to fifty per cent maximum by weight referred to the amount of calcium hydroxide. To safeguard the resistance to storing the calcium hydroxide $Ca(OH)_2$ may entirely or partially be substituted by an equimolar amount of calcium oxide $CaO$ and stored mixed with the dry casein, the warming shortening the stirring process when the powder mixture is stirred with water. Referred to the weight of the calcium hydroxide present after the stirring with water the following salts may be added to the mixture:

0.58 per cent of sodium chloride $NaCl$
0.013 per cent of potassium chloride $KCl$
0.013 per cent of dehydrated calcium chloride $CaCl_2$
0.007 per cent of magnesium chloride $MgCl_2$.

Sodium bicarbonate $NaHCO_3$, the ingredient of all blood isotonic blood salt solutions, shall therefore not be added.

Example 680.4 grams of calcium oxide $CaO$ are slaked with one litre of a watery solution containing 5.80 grams of sodium chloride $NaCl$, 0.135 grams of potassium chloride $KCl$, 0.133 gram of calcium chloride $CaCl_2$ and 0.067 gram of magnesium chloride $MgCl_2$, and the resulting powder is dried at 120° C. for dehydration. Then 75.6 grams of calcium oxide $CaO$ obtained by burning calcium hydroxide $Ca(OH)_2$ at temperatures between 500 and 600° C. are added to the finely ground powder. The sum of the calcium hydroxide $Ca(OH)_2$ and of the calcium oxide $CaO$ corresponds to a mass of 1000 grams of calcium hydroxide $Ca(OH)_2$. Now 500 grams of casein powder after drying in the desiccator are admixed to this powder.

A particularly approved and universally applicable mixture is composed of 85.000 per cent by weight of calcium hydroxide $Ca(OH)_2$
4.447 per cent by weight of calcium oxide CaO
10.000 per cent by weight of dry casein
0.522 per cent by weight of sodium chloride NaCl
0.012 per cent by weight of potassium chloride KCl
0.012 per cent by weight of calcium chloride $CaCl_2$
0.007 per cent by weight of magnesium chloride $MgCl_2$.

The powder mixture is placed immediately so as to fill hermetically closing flasks. At the time of application about one gram of this substance is stirred with about 0.6 c. c. of water on a glass plate like cement by means of a metal spatula for about two to three minutes and inserted in the usual way into the cavity as underfilling like cement.

If for simple explanation's sake there was mentioned only the suitableness of the described substance as an underfilling material, it does not mean that there are no other additional possibilities of application for this raw material. Owing to its good and widely variable consistency this raw material may also be applied where heretofore only dental cements and amalgams entered into consideration as a sealing material e. g. with root-tip resections. Here too the raw material described shows surprising advantages, because unlike calcium hydroxide it does not disintegrate after accession of tissue-moisture on the one side, and on the other it does not lead to any inflammatory reactions on the bone and in the tissue as the cements and amalgams do. Apart from its outstanding mechanical qualities the excellent tissue-phile property of this raw material is of great advantage which has been proved by histological and clinical tests and which ensures a wide range of application of this material.

What I claim is:

Process for preparing an adhesive underfilling material under tooth fillings, comprising the steps of forming a mixture of a material selected from the class consisting of calcium oxid and calcium hydroxid, together with dry powdered casein, the weight of the casein relative to the weight of the calcium hydroxid being between 10 and 50%, whereby said selected calcium compound constitutes a major constituent of the mixture, preparing an aqueous solution containing chlorids of sodium, potassium, calcium and magnesium in relative percentages substantially corresponding to haemoisotonic saline fluid, by the solution of said chlorids in water, and moistening said powder mixture with said aqueous solution to a predetermined consistency.

ADOLF KNAPPWOST.

References Cited in the file of this patent

UNITED STATES PATENTS

| Number | Name | Date |
|---|---|---|
| 567,592 | Hall | Sept. 15, 1896 |
| 825,268 | Eilertsen | July 3, 1906 |
| 1,424,908 | Isaacs | Aug. 8, 1922 |
| 1,758,500 | Christmas | May 13, 1930 |
| 1,937,484 | Bogin | Nov. 28, 1933 |
| 2,353,822 | Gardner | July 18, 1944 |
| 2,516,438 | Wheeler | July 25, 1950 |

FOREIGN PATENTS

| Number | Country | Date |
|---|---|---|
| 373,986 | Germany | 1923 |

OTHER REFERENCES

Hopkins Scientific American Cyclopedia of Formulas (1925), page 291.